(12) United States Patent
Hwang et al.

(10) Patent No.: US 7,869,454 B2
(45) Date of Patent: *Jan. 11, 2011

(54) METHOD FOR COMMUNICATING SCRAMBLING CODE ID IN MOBILE COMMUNICATION SYSTEM

(75) Inventors: Sung-Oh Hwang, Yongin-shi (KR);
Jae-Yoel Kim, Kunpo-shi (KR);
Hee-Won Kang, Seoul (KR);
Kyeong-Cheol Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 745 days.

This patent is subject to a terminal disclaimer.

(21) Appl. No.: 11/091,265

(22) Filed: Mar. 28, 2005

(65) Prior Publication Data
US 2005/0169349 A1 Aug. 4, 2005

Related U.S. Application Data

(63) Continuation of application No. 09/641,147, filed on Aug. 17, 2000, now Pat. No. 7,221,695.

(30) Foreign Application Priority Data
Aug. 17, 1999 (KR) .................................. 99-34014

(51) Int. Cl.
*H04B 7/216* (2006.01)

(52) U.S. Cl. .................... 370/441; 370/203; 370/310; 370/320; 370/335; 370/342

(58) Field of Classification Search ................. 370/335, 370/331, 342, 479, 503, 230, 231, 232, 233, 370/234, 235, 236, 237, 238, 320, 322, 445, 370/310, 312, 326, 348, 350, 431, 432, 433, 370/441, 509, 510; 455/450, 452, 456, 457, 455/442, 464, 436, 437, 439, 444, 65, 273, 455/277.1, 277.2, 504, 506, 560; 375/152, 375/150, 130, 140, 143, 145, 147, 149
See application file for complete search history.

(56) References Cited

U.S. PATENT DOCUMENTS 5,204,874 A * 4/1993 Falconer et al. ............. 375/130

(Continued)

FOREIGN PATENT DOCUMENTS

EP 0729240 8/1996

(Continued)

OTHER PUBLICATIONS

3rd Generation Partnership Project (3GPP), TS 25.213, Jun. 1999, V.2.1.0, pp. 1-25.*

(Continued)

*Primary Examiner*—Aung S Moe
*Assistant Examiner*—Abdullah Riyami
(74) *Attorney, Agent, or Firm*—The Farrell Law Firm, LLP

(57) ABSTRACT

Disclosed is a method for transmitting a channel signal in a base station of a mobile communication system which scrambles a common channel signal using a primary scrambling code for identifying the base station. The method comprises determining an identifier (ID) of a secondary scrambling code, upon receipt of a dedicated channel assignment request from a mobile station; transmitting the determined ID of the secondary scrambling code to the mobile station and awaiting a response; upon receipt of a response message from the mobile station, generating a primary scrambling code and a secondary scrambling code using an ID of the primary scrambling code and said ID of the secondary scrambling code; and scrambling a common channel signal using the primary scrambling code, scrambling a dedicated channel signal using the secondary scrambling code, and transmitting the scrambled channel signals.

24 Claims, 11 Drawing Sheets

U.S. PATENT DOCUMENTS

| | | | |
|---|---|---|---|
| 5,353,352 A | 10/1994 | Dent et al. | |
| 5,455,822 A | 10/1995 | Dixon et al. | |
| 5,550,809 A * | 8/1996 | Bottomley et al. | 370/342 |
| 5,734,648 A * | 3/1998 | Adachi et al. | 370/342 |
| 5,862,221 A * | 1/1999 | Muraoka | 380/270 |
| 5,923,650 A * | 7/1999 | Chen et al. | 370/331 |
| 5,930,290 A * | 7/1999 | Zhou et al. | 375/143 |
| 5,956,368 A * | 9/1999 | Jamal et al. | 375/146 |
| 5,978,412 A * | 11/1999 | Takai | 375/145 |
| 6,130,884 A * | 10/2000 | Sato | 370/335 |
| 6,141,374 A * | 10/2000 | Burns | 375/152 |
| 6,173,005 B1 * | 1/2001 | Kotzin et al. | 375/141 |
| 6,229,572 B1 * | 5/2001 | Ciardullo et al. | 348/473 |
| 6,243,397 B1 * | 6/2001 | Yun | 370/480 |
| 6,339,646 B1 * | 1/2002 | Dahlman et al. | 380/273 |
| 6,370,130 B1 * | 4/2002 | Zhou et al. | 370/335 |
| 6,385,232 B1 | 5/2002 | Terashima | |
| 6,385,264 B1 | 5/2002 | Terasawa et al. | |
| 6,442,152 B1 * | 8/2002 | Park et al. | 370/341 |
| 6,487,238 B1 * | 11/2002 | Kamo | 375/150 |
| 6,498,789 B1 * | 12/2002 | Honda | 370/342 |
| 6,504,830 B1 | 1/2003 | Ostberg et al. | |
| 6,526,091 B1 | 2/2003 | Nystrom et al. | |
| 6,542,484 B1 * | 4/2003 | Ovesjo et al. | 370/335 |
| 6,567,482 B1 | 5/2003 | Popovic | |
| 6,574,205 B1 * | 6/2003 | Sato | 370/335 |
| 6,621,807 B1 * | 9/2003 | Jung et al. | 370/335 |
| 6,714,528 B1 * | 3/2004 | Moon et al. | 370/342 |
| 6,724,813 B1 * | 4/2004 | Jamal et al. | 375/219 |
| 6,810,030 B1 * | 10/2004 | Kuo | 370/335 |
| 6,836,469 B1 * | 12/2004 | Wu | 370/322 |
| 6,859,445 B1 * | 2/2005 | Moon et al. | 370/335 |
| 7,123,579 B1 * | 10/2006 | Lyu | 370/203 |
| 7,197,066 B2 * | 3/2007 | Iwamoto et al. | 375/150 |
| 7,308,104 B1 * | 12/2007 | Kim et al. | 380/268 |
| 2001/0000136 A1 * | 4/2001 | Dixon et al. | 370/342 |
| 2001/0012280 A1 * | 8/2001 | Dent | 370/335 |
| 2001/0018343 A1 * | 8/2001 | Nakata | 455/426 |
| 2002/0037726 A1 * | 3/2002 | Czaja et al. | 455/442 |
| 2002/0131414 A1 * | 9/2002 | Hadzic | 370/393 |
| 2002/0196754 A1 * | 12/2002 | Lugil et al. | 370/335 |
| 2004/0081077 A1 * | 4/2004 | Mennekens et al. | 370/208 |
| 2004/0161019 A1 * | 8/2004 | Raghavan et al. | 375/141 |
| 2005/0169349 A1 * | 8/2005 | Hwang et al. | 375/130 |
| 2007/0115875 A1 * | 5/2007 | Toskala et al. | 370/328 |
| 2007/0123291 A1 * | 5/2007 | Moulsley et al. | 455/522 |
| 2007/0140206 A1 * | 6/2007 | Yano et al. | 370/342 |

FOREIGN PATENT DOCUMENTS

| | | | |
|---|---|---|---|
| EP | 0 892 503 | | 1/1999 |
| EP | 0 901 236 | | 3/1999 |
| EP | 0 963 070 | | 12/1999 |
| JP | 01-295540 | | 11/1989 |
| JP | 09-327059 | | 12/1997 |
| RU | 2090004 | | 10/1997 |
| WO | WO 99/12273 | | 3/1999 |
| WO | WO 99/12284 | * | 3/1999 |
| WO | WO 99/26369 | | 5/1999 |

OTHER PUBLICATIONS

3GPP TSG-RAN Working Group 1 Meeting #5, Multiple scrambling codes, Jun. 1-4, 1999, TSGR1#5(99)724.

3GPP TSG-RAN Working Group 1 specification, Physical channels and mapping of transport channels onto physical channels, Apr. 1999, TS 25.211 v2.0.0 (Apr. 1999).

3GPP TSG-RAN Working Group 1 Specificiation, Spreading and modulation, Apr. 1999, TS 25.213-v2.0.0 (Apr. 1999).

Samsung Electronics Co., Multiple Scrambling Codes, TSG-RAN Working Group 1, Meeting #5, Jul. 13-16, 1999.

Samsung, Text Proposal for Multiple Scrambling Codes, TSG-RAN Working Group 1, Meeting #6, Jul. 13-16, 1999.

$3^{rd}$ Generation Partnership Project, Technical Specification Group, Radio Access Network, Working Group 1, Spreading and Modulation, Jun. 1999.

$3^{rd}$ Generation Partnership Project, Technical Specification Group, Working Group 2, RRC Protocol Specification, Jun. 1999.

"Decision on Grant" RU 2001110373/09(012421).

* cited by examiner

METHOD FOR COMMUNICATING SCRAMBLING CODE ID IN MOBILE COMMUNICATION SYSTEM

PRIORITY

This application is a continuation of application Ser. No. 09/641,147, filed Aug. 17, 2000 now U.S. Pat. No. 7,221,695, and claims priority to an application entitled "Method for Communicating Scrambling Code ID in Mobile Communication System" filed in the Korean Industrial Property Office on Aug. 17, 1999 and assigned Serial No. 99-34014, the contents of which are hereby incorporated by reference.

BACKGROUND OF THE INVENTION

1. Field of the Invention

The present invention relates generally to a channel communication method in a mobile communication system, and in particular, to a communication method for readily setting a secondary scrambling code in a mobile communication system which expands a channel capacity using a plurality of scrambling codes.

2. Description of the Related Art

In general, a CDMA (Code Division Multiple Access) communication system uses scrambling codes for identification of base stations. The scrambling codes are also used for an increase in the channel capacity of the base stations as well as identification of the base stations.

A UMTS (Universal Mobile Telecommunication System) communication system, which is a European W-CDMA communication system, uses a plurality of scrambling codes for identification of the base station and an increase in the channel capacity of the base stations. In the UMTS system, when a base station has used up all the orthogonal codes assigned to one scrambling code and thus has no more available orthogonal code, the base station uses another scrambling code to expand the channel capacity. That is, the base station sets a new scrambling code and then assigns orthogonal codes for the newly set scrambling code. To generate the scrambling codes, a Gold sequence of length $2^{18}-1$ is typically used. In the Gold sequence of length $2^{18}-1$, $2^{18}-1$ different Gold codes constitute one group. For the scrambling codes, the Gold code of length $2^{18}-1$ is repeatedly selected by 38400 bits from the first bit.

In general, the scrambling code used for identification of the base stations is referred to as a "primary scrambling code". The primary scrambling code and orthogonal codes using the primary scrambling code are then assigned. If the orthogonal code is insufficient to assign for newly adding channels using the primary scrambling code, another scrambling code is set and then orthogonal codes using the set scrambling code are assigned. The scrambling code used at that case is referred to as a "secondary scrambling code". That is, the number of the orthogonal codes which can be assigned using the corresponding scrambling code is determined by the data rate of presently communicating channels. Therefore, it is possible to expand the channel capacity by providing a plurality of the scrambling codes and setting an unused scrambling code when the channel capacity is insufficient.

The primary scrambling code is used for identification of the base stations and for scrambling the signal spread with the assigned orthogonal codes. It will be assumed herein that the number of the primary scrambling codes is 512. Therefore, adjacent base stations use different primary scrambling codes out of the 512 primary scrambling codes.

In general, the mobile stations identify the base stations by analyzing the primary scrambling codes. Therefore, the base station transmits the common control channels to the mobile stations using a unique primary scrambling code, and transmits the downlink channels using either the primary scrambling code or the secondary scrambling code according to the present channel capacity.

In general, the base station transmits the common control channels to the mobile stations using a unique primary scrambling code, and transmits the downlink channels using either the primary scrambling code or the secondary scrambling code according to the present channel capacity. Therefore, the mobile stations identify the base stations by analyzing the primary scrambling codes.

The secondary scrambling codes used to increase the channel capacity of the base stations correspond to the primary scrambling codes used in the base station, and the maximum number of the secondary scrambling codes is 512. The base station selects the secondary scrambling codes.

Reference will now be made to UMTS downlink transmission for which several scrambling codes are used.

FIG. 1 illustrates a downlink channel transmitter of a UMTS base station. Referring to FIG. 1, a dedicated physical control channel DPCCH and N dedicated physical data channels $DPDCH_1$-to $DPDCH_N$ are applied to demultiplexers 100 to 104, respectively, after channel coding and interleaving. The demultiplexers 100-104 demultiplex DPCCH and $DPDCH_1$-$DPDCH_N$ into I and Q signal components, respectively. The I and Q signal components output from the demultiplexer 100 are applied to multipliers 110 and 111, which multiply the received I and Q signal components by a first orthogonal code for channel separating of the I and Q signals. A scrambler 120 scrambles the multiplied signals. The demultiplexers 102-104 have the same operation as the demultiplexer 100, multipliers 114, 115, 118 and 119 have the same operation as the multipliers 110 and 111, and scramblers 124 and 128 have the same operation as the scrambler 120.

A scrambling code generator 150 generates scrambling codes and provides the generated scrambling codes to the scramblers 120, 124 and 128. The scrambling codes generated by the scrambling code generator 150 include the primary scrambling codes, and the secondary scrambling codes for increasing the channel capacity of the base stations. The scrambling code generator 150 provides the primary scrambling codes to the scramblers that use the primary scrambling codes, and the secondary scrambling codes to the scramblers that use the secondary scrambling codes.

The scramblers 120, 124 and 128 each complex-multiply the multiplied input signals by the corresponding scrambling codes, and provides the resulting real part components to a summer 130 and the resulting imaginary components to a summer 135. The summer 130 sums the real part components of the scrambled signals and the summer 135 sums the imaginary part components of the scrambled signals.

FIG. 2 illustrates a detailed structure of the scrambling code generator 150 of FIG. 1, which simultaneously generates several scrambling codes.

Referring to FIG. 2, the common control channels normally use the primary scrambling codes. However, when there is an insufficient number of the orthogonal codes, the downlink dedicated channels should use the secondary scrambling codes. Therefore, it is necessary for the base station to be able to generate a plurality of scrambling codes. In FIG. 2, control information #1 to control information #N of scrambling codes for several channels are applied to N Gold sequence generators 211-21N, respectively. The Gold sequence generators 211-21N generate Gold codes corresponding to the received control information #1 to control information #N, and output the I-channel components unchanged and provide the Q-channel components to corresponding delays 221-22N. The delays 221-22N delay the received Q-channel components for a specific chip period.

FIG. 3 illustrates a downlink channel receiver of a UMTS mobile station. The receiver be able to descramble the received down link common control channel signals that were scrambled with the primary scrambling code in the base station. And should also be able to descramble other received downlink channels, which were scrambled with the primary scrambling codes or the secondary scrambling codes in the base station. Therefore, the receiver should be able to generate a plurality of scrambling codes to descramble the received downlink channels.

In FIG. 3, the I and Q components of the signals received at the mobile station are applied to descramblers 310 and 315, respectively. A scrambling code generator 300 simultaneously generates primary scrambling codes and secondary scrambling codes for respective channels, and provides the generated scrambling codes to the descramblers 310 and 315. The descramblers 310 and 315 multiply the received signals I+jQ by conjugate values of the scrambling codes provided from the scrambling code generator 300 to despread (descramble) the received signals, and provide the descrambled I and Q components to multipliers 320-326. The signals output from the descramblers 310 and 315 are applied to the multipliers 320-326 where the signals are multiplied by orthogonal codes for the corresponding channels, for despreading. Thereafter, the despread signals are multiplexed by multiplexers 330 and 335.

FIG. 4 illustrates a detailed structure of the scrambling code generator 300 of FIG. 3, which simultaneously generates several scrambling codes. In the base station for the mobile communication system, which uses the scrambling codes, the common control channels are normally scrambled with the primary scrambling codes and other channels are scrambled with either the primary scrambling codes or the secondary scrambling codes according to the system capacity. Therefore, the mobile station should be able to generate the secondary scrambling codes as well as the primary scrambling codes. In addition, since the signal scrambled with primary scrambling code and the signal scrambled with secondary scrambling code can be simultaneously received, it is necessary for the mobile station to be able to simultaneously generate the primary scrambling codes and the secondary scrambling codes.

Referring to FIG. 4, upon receipt of control information #1 and control information #2 of scrambling codes for the respective channels, Gold sequence generators 411 and 412 generate Gold codes corresponding to the control information #1 and #2. At this point, the I components of the generated Gold codes are output unchanged, and the Q components are delayed by the corresponding delays 421 and 422 for a specific chip period.

FIG. 5 illustrates a detailed structure of the Gold sequence generators of FIGS. 2 and 4. In general, a Gold sequence is generated by XORing two different m-sequences. In FIG. 5, an m-sequence generator polynomial of an upper shift register 500 is $f(x)=x^{18}+x^7+1$, and a generator polynomial of a lower shift register 510 is $f(x)=x^{18}+x^{10}+x^7+x^5+1$.

The number of Gold codes generated by the Gold sequence generator of FIG. 5 is 512*512=262,144. The Gold codes generated by the Gold sequence generator are divided into the primary scrambling codes and the secondary scrambling codes. Of the 261,144 Gold codes, 512 are the primary scrambling codes, and 511 Gold codes are associated with each primary scrambling code, constituting a set of the secondary scrambling codes.

The 512 primary scrambling codes are generated by setting 512 upper shift register initial values and XORing the output of upper shifter register 500 and the lower shift register 510. Here, the upper shift register 500 has a binary value of a decimal number of 0 to 511 as an initial value, and the lower shift register 510 normally has a value of '1' at every shift register as an initial value. The secondary scrambling codes are generated by providing i+512*k as an initial value of the upper register 500, where 'i' denotes a code number of the primary scrambling code and 'k' denotes a value of 1 to 511. Therefore, each primary scrambling code is associated with 511 secondary scrambling codes. Each base station uses one primary scrambling code, and uses one or more secondary scrambling codes as occasion demands.

The primary scrambling codes are necessarily used when scrambling a primary common control channel (P_CCPCH). Other downlink physical channels are scrambled with either the primary scrambling signal or a secondary scrambling code selected from the secondary scrambling code set, before transmission.

As described with reference to FIGS. 1 to 5, there can be used several scrambling codes at the request of the base station. Therefore, the base station should include a scrambling code generator, which can simultaneously generate several scrambling codes, and the mobile station should also have a scrambling code generator, which can generate several scrambling codes, in order to correctly receive the signals transmitted from the base station.

Referring again to FIG. 5, the Gold sequence generator cannot simultaneously generate several scrambling codes, and generates only one scrambling code at a time. Thus, to generate several scrambling codes, it is necessary to provide a number of the Gold sequence generators equal to the number of the scrambling codes.

In addition, the number of the scrambling codes generated by the Gold sequence generator of FIG. 5 is 262,144 in total. Each base station can perform communication even with one primary scrambling code and 511 secondary scrambling codes associated with the primary scrambling code. It is not difficult for the base station to store 262,144 scrambling codes, considering its large memory capacity. However, the mobile station, which performs communication while traveling between base stations, cannot know which primary scrambling code and secondary scrambling code are used by the base stations, the mobile station should store all the 262,144 scrambling codes. A storage area for storing the 262,144 scrambling codes will occupy a considerable storage area of the mobile station, considering the small memory capacity of the mobile station.

Further, in the case where the scrambling codes are generated using the Gold codes of FIG. 5, when there are an insufficient orthogonal codes for the primary scrambling codes, the base station should inform the mobile station of information about a secondary scrambling code which will be using, while transmitting the channel signals which were scrambled with the secondary scrambling codes. However, since the base station should transmit one of the numbers of 512 to 262,144 indicating the secondary scrambling code, the base station should transmit 18-bit information about the secondary scrambling codes.

SUMMARY OF THE INVENTION

It is, therefore, an object of the present invention to provide a method for effectively communicating secondary scrambling codes, which are used to expand a channel capacity in a mobile communication system.

It is another object of the present invention to provide a method for assigning a channel to a mobile station in a mobile communication system which uses primary scrambling codes and secondary scrambling codes, wherein a base station transmits ID information of the secondary scrambling code and information about a channel orthogonal code to the mobile station, while assigning a channel using the secondary scrambling code.

It is further another object of the present invention to provide a method for generating a scrambling code in a mobile communication system which uses primary scrambling codes and secondary scrambling codes, wherein a user equipment analyzes information transmitted from a base station, generates, upon receipt of ID information of the secondary scrambling code, a mask using an ID of the primary scrambling code and the received ID of the secondary scrambling code, and generates the scrambling code using the mask.

To achieve the above and other objects, there is provide a method for transmitting a channel signal in a base station of a mobile communication system which scrambles a common channel signal using a primary scrambling code for identifying the base station. The method comprises determining an identifier (ID) of a secondary scrambling code, upon receipt of a dedicated channel assignment request from a mobile station; transmitting the determined ID of the secondary scrambling code to the mobile station and awaiting a response; upon receipt of a response message from the mobile station, generating a primary scrambling code and a secondary scrambling code using an ID of the primary scrambling code and said ID of the secondary scrambling code; and scrambling a common channel signal using the primary scrambling code, scrambling a dedicated channel signal using the secondary scrambling code, and transmitting the scrambled channel signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
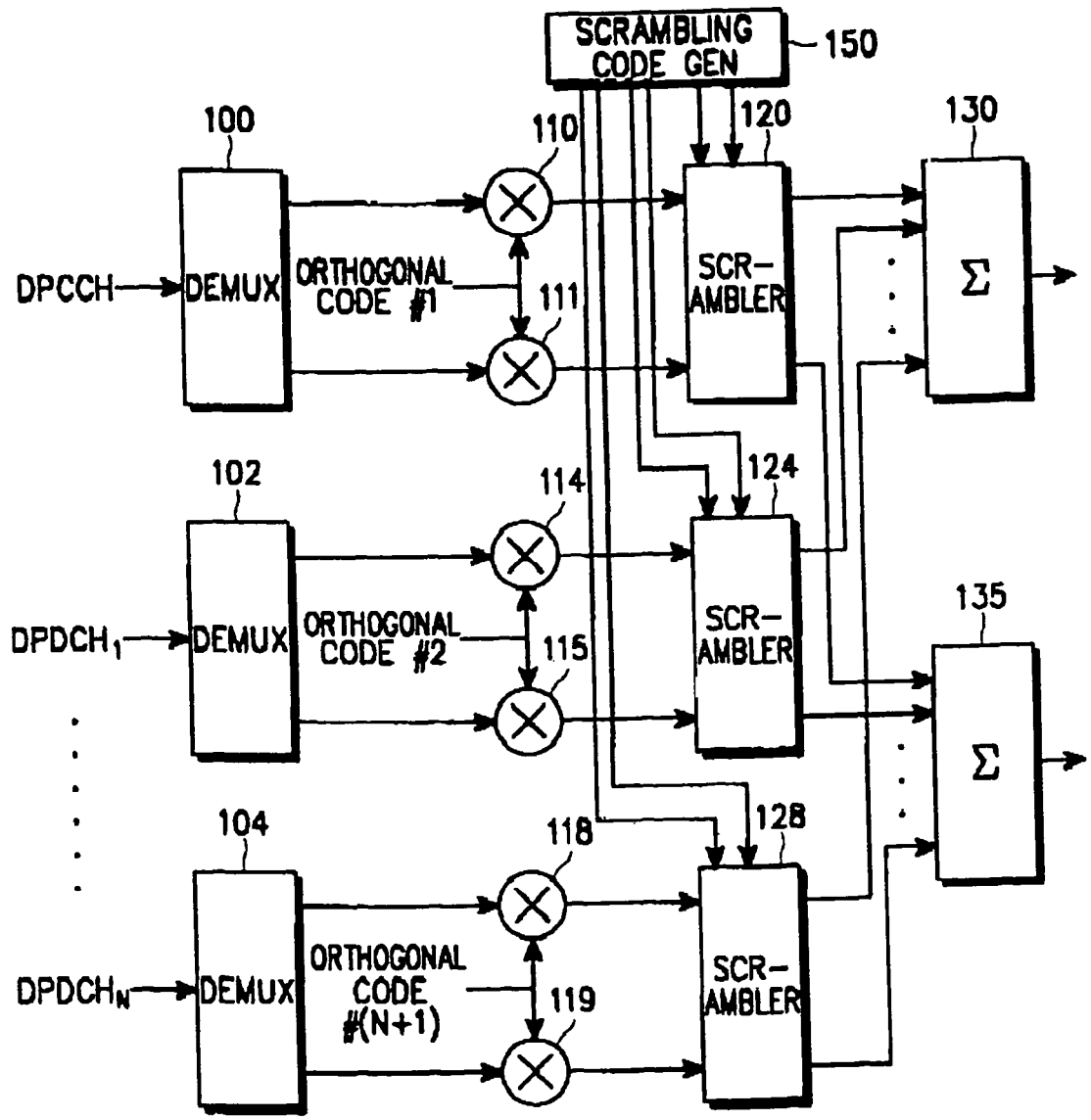
FIG. 1 is a diagram illustrating a downlink channel transmitter of a UMTS base station.
Figure 2:
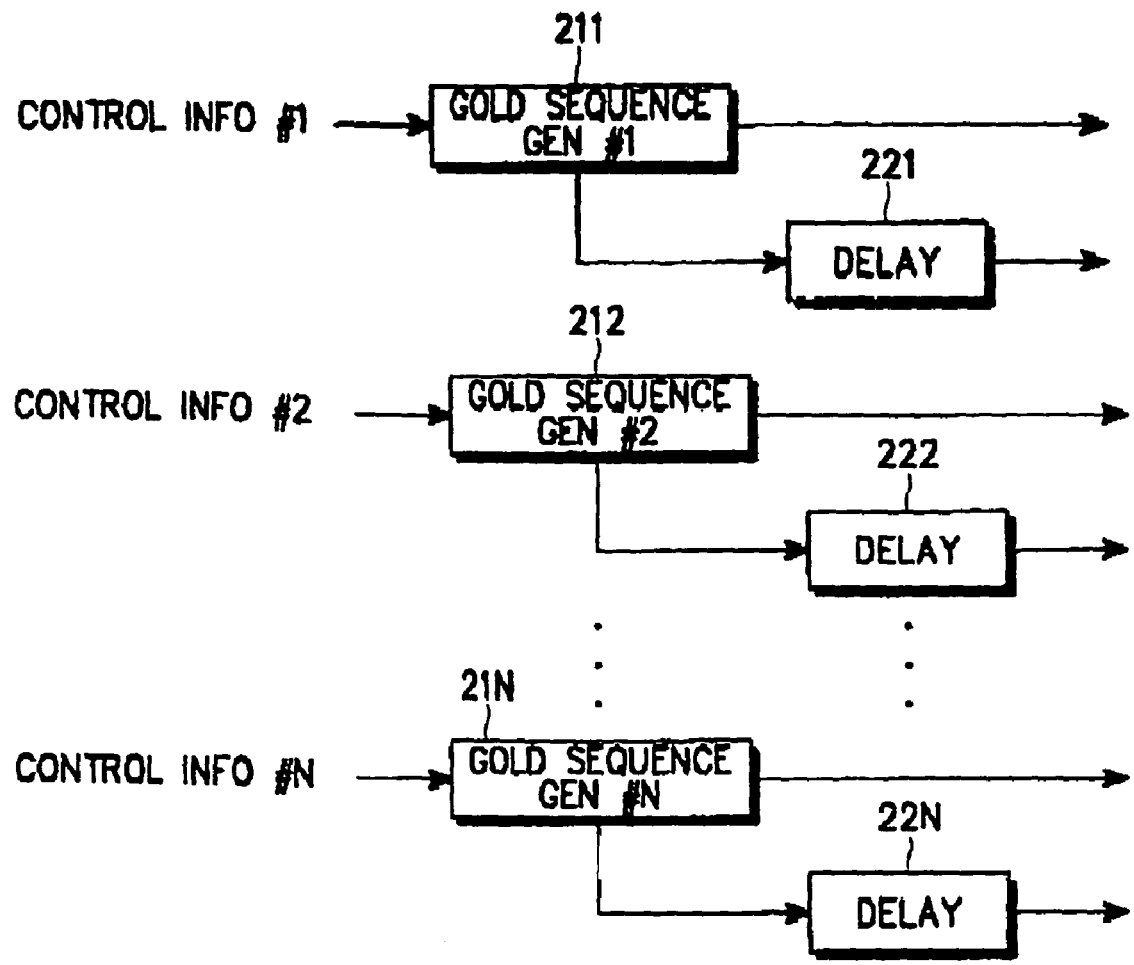
FIG. 2 is a diagram illustrating a detailed structure of the scrambling code generator of FIG. 1, for simultaneously generating several scrambling codes.
Figure 3:
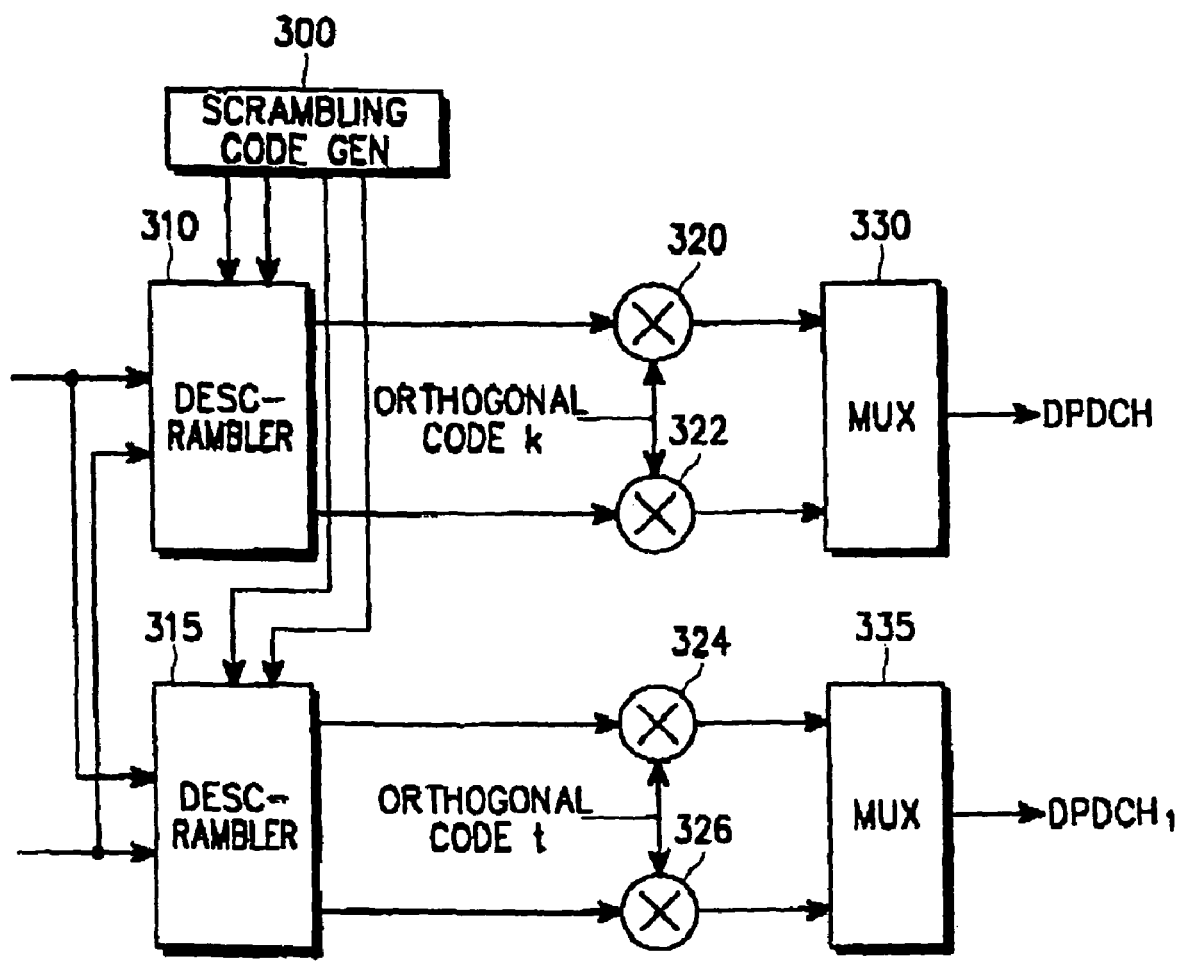
FIG. 3 is a diagram illustrating a downlink channel receiver of a UMTS mobile station.
Figure 4:
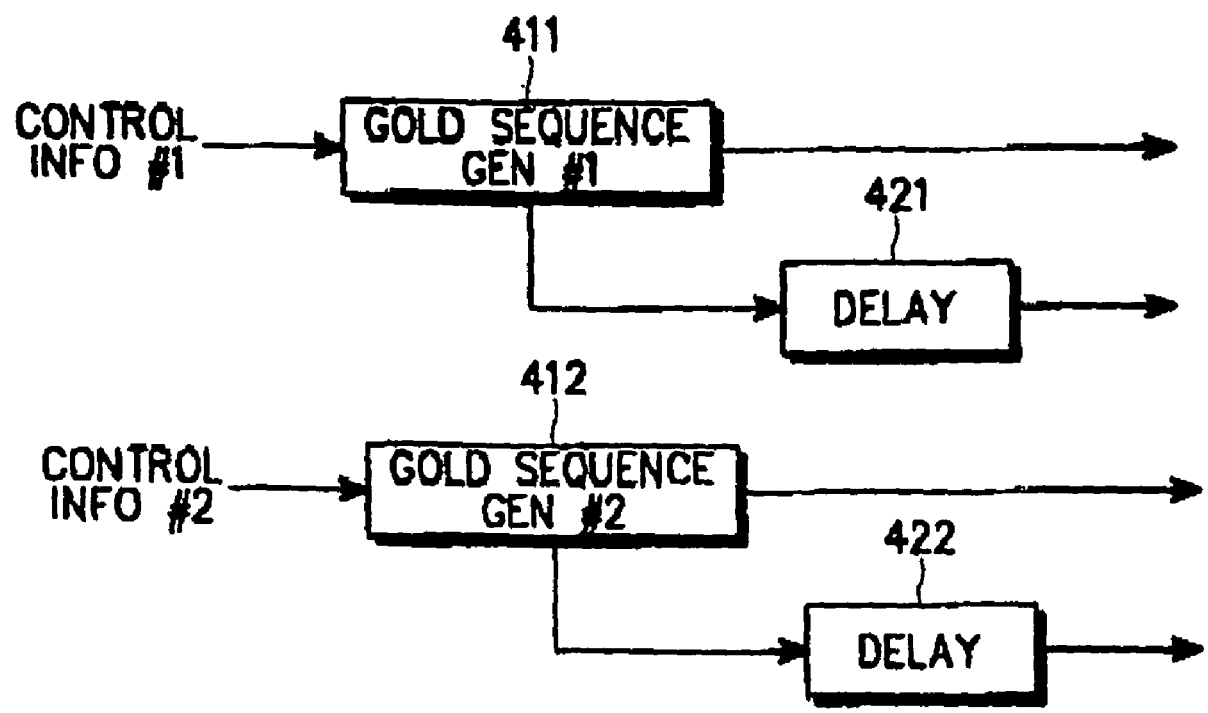
FIG. 4 is a diagram illustrating a detailed structure of the scrambling code generator of FIG. 3, for simultaneously generating several scrambling codes.

A preferred embodiment of the present invention will be described herein below with reference to the accompanying drawings. In the following description, well-known functions or constructions are not described in detail since they would obscure the invention in unnecessary detail.

The terms "mobile station" or "MS" as used herein refer to a mobile terminal or user equipment (UE). Further, the term "primary scrambling code" refers to a code used for identification of the base stations (BS), and the term "secondary scrambling code" refers to a code used to expand the channel capacity of the base stations. In an exemplary embodiment of the present invention, it is assumed that the primary scrambling code is assigned to the channels (e.g., common control channel) transmitted in common to every mobile station from the base station, and the secondary scrambling code is assigned to the dedicated channel when there is an insufficient number of the primary scrambling codes. In addition, the primary scrambling code is generated by XORing the output of a first m-sequence generator which initial value is determined by the primary ID (i.e., an ID of the primary scrambling code) and an output of a second m-sequence generator, and the secondary scrambling code is generated by XORing the output signal which is made by masking the first shift registers value and mask value which is determined by the primary ID and a secondary ID (i.e., an ID of the secondary scrambling code) and an output of a second m-sequence.

Gold codes are typically used to constitute the above scrambling codes. The Gold codes are generated by summing two different m-sequences having a good correlation property. If there are two different m-sequences $m_1(t)$ and $m_2(t)$ each having a length L, the number of sets of the Gold codes generated from the m-sequences becomes L, and there is provided a good correlation property among L different Gold sequences. A set of the Gold sequences can be expressed by Equation (1) below.

$$G = [m_1(t+\tau) + m_2(t) | 0 \leq \tau \leq L-1] \quad (1)$$

From Equation (1), a set of the Gold codes is equal to a set of all the sequences obtained by summing the cyclic-shifted m-sequence $m_1(t)$ and the m-sequence $m_2(t)$. Therefore, in the embodiment of the present invention, the sum of the m-sequence $m_1(t)$, which is cyclic-shifted by $\tau$, and the m-sequence $m_2(t)$ will be called $g_\tau$. Then, the following relationship is given.

$$g_\tau(t) = m_1(t+\tau) + m_2(t) \quad (2)$$

In Equation (2), if a period of the m-sequences is $2^{18}-1$, it is possible to cyclic-shift the $m_1(t)$ by a maximum of $2^{18}-1$, and the number of the elements in the set of the Gold codes generated by the sum of the cyclic-shifted $m_1(t)$ and $m_2(t)$ is equal to $2^{18}-1$ which is equal to a period by which the $m_1(t)$ can be cyclic-shifted.

A set of the Gold codes, to be used in the embodiment of the present invention, includes as elements the Gold codes determined by the sum of the m-sequence $m_1(t)$ having a generator polynomial shown in Equation (3) and the m-sequence $m_2(t)$ having a generator polynomial shown in Equation (4), and the number of the Gold codes is $2^{18}-1$.

$$f(x)=x^{18}+x^7+1 \tag{3}$$

$$f(x)=x^{18}+x^{10}+x^7+x^5+1 \tag{4}$$

The embodiment of the present invention uses a mask to generate the Gold codes. Specifically, the present invention employs a method for simultaneously generating a number of the Gold codes equal to the number of the used masks. Here, the method for simultaneously generating several Gold codes can be implemented by applying a mask function on the memory values of a shift register for generating the cyclic-shifted m-sequence $m_1(t)$.

The conventional scrambling code generation method fixes an initial value of the m-sequence $m_2(t)$ and then uses a binary number of a scrambling code index for an initial value of the m-sequence $m_1(t)$, thereby generating different Gold sequences. Thereafter, different scrambling codes are generated using the different Gold sequences. The embodiment of the present invention, however, generates the different scrambling codes in a method different from the conventional scrambling code generation method.

A method for generating different scrambling codes according to the present invention fixes initial values of the $m_1(t)$ and the $m_2(t)$ and applies different masks on the m-sequence generated by the $m_1(t)$ so that the Gold codes generated by the masks should be different from one another. Every base station uses the same initial values for the $m_1(t)$ and $m_2(t)$. The reason for using the same initial values for the two m-sequences in every base station is as follows. That is, if each base station takes a mask using the different initial value and generates the Gold code, some Gold codes generated by different base stations may be equal to each other. For this reason, in the embodiment of the present invention, every base station uses the same initial values for the m-sequences $m_1(t)$ and $m_2(t)$, and generates the different scrambling codes by applying the different masks to the $m_1(t)$.

The embodiment of the present invention provides a generator for simultaneously generating several Gold codes using the above mask functions, and a mask structure applied to the generator. Further, the present invention provides a method for simultaneously generating several primary scrambling codes and several secondary scrambling codes using the above generator, and a method for generating the primary scrambling codes and the secondary scrambling codes when necessary, rather than storing the scrambling codes in a memory, in order to reduce the hardware complexity.

Figure 6:
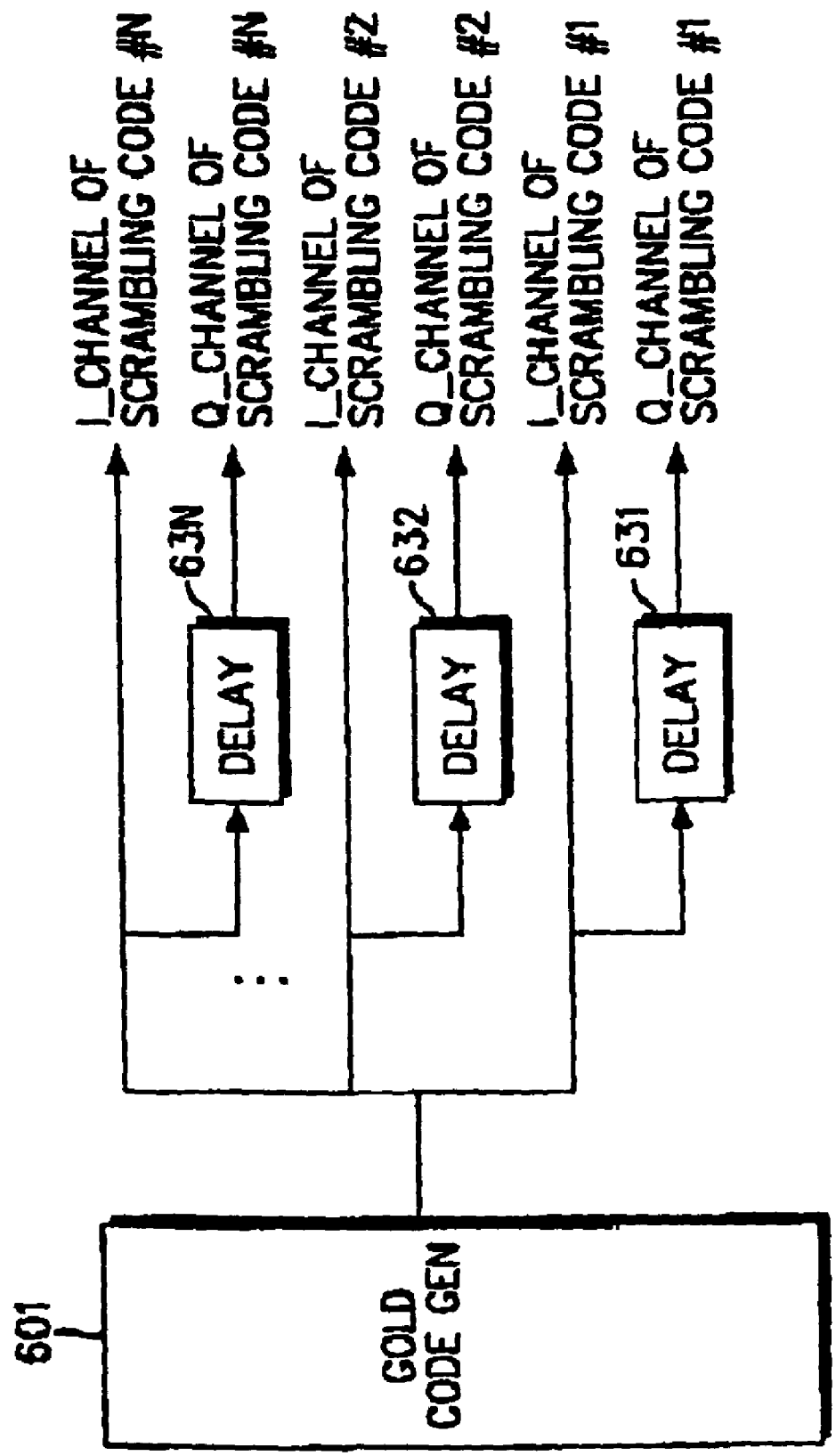
FIG. 6 is a diagram illustrating a scrambling code generator for simultaneously generating several scrambling codes according to an embodiment of the present invention.

FIG. 6 illustrates a structure of a scrambling code generator for simultaneously generating several scrambling codes according to an embodiment of the present invention.

Referring to FIG. 6, the scrambling code generator is divided into a Gold code generator 601 and a scrambling code generation section. The Gold code generator 601 includes two shift registers for generating m-sequences, and a masking section for generating new m-sequences by receiving memory values of the upper shift register and mask coefficients. The scrambling code generation section receiving the generated Gold codes through the I and Q channels, outputs the I-channel components unchanged, and delays the Q-channel components for a specific chip period, thereby generating complex scrambling codes. The scrambling code generation section includes delays 631-63N.

The number of the Gold codes output from the Gold code generator 601 is equal to the number of the masks in the Gold code generator 601. The I-channel components of the different Gold codes generated through the respective masks are output unchanged, and the Q-channel components are delayed by the delays 631-63N for a specific chip period, thereby generating different scrambling codes.

Figure 7A:
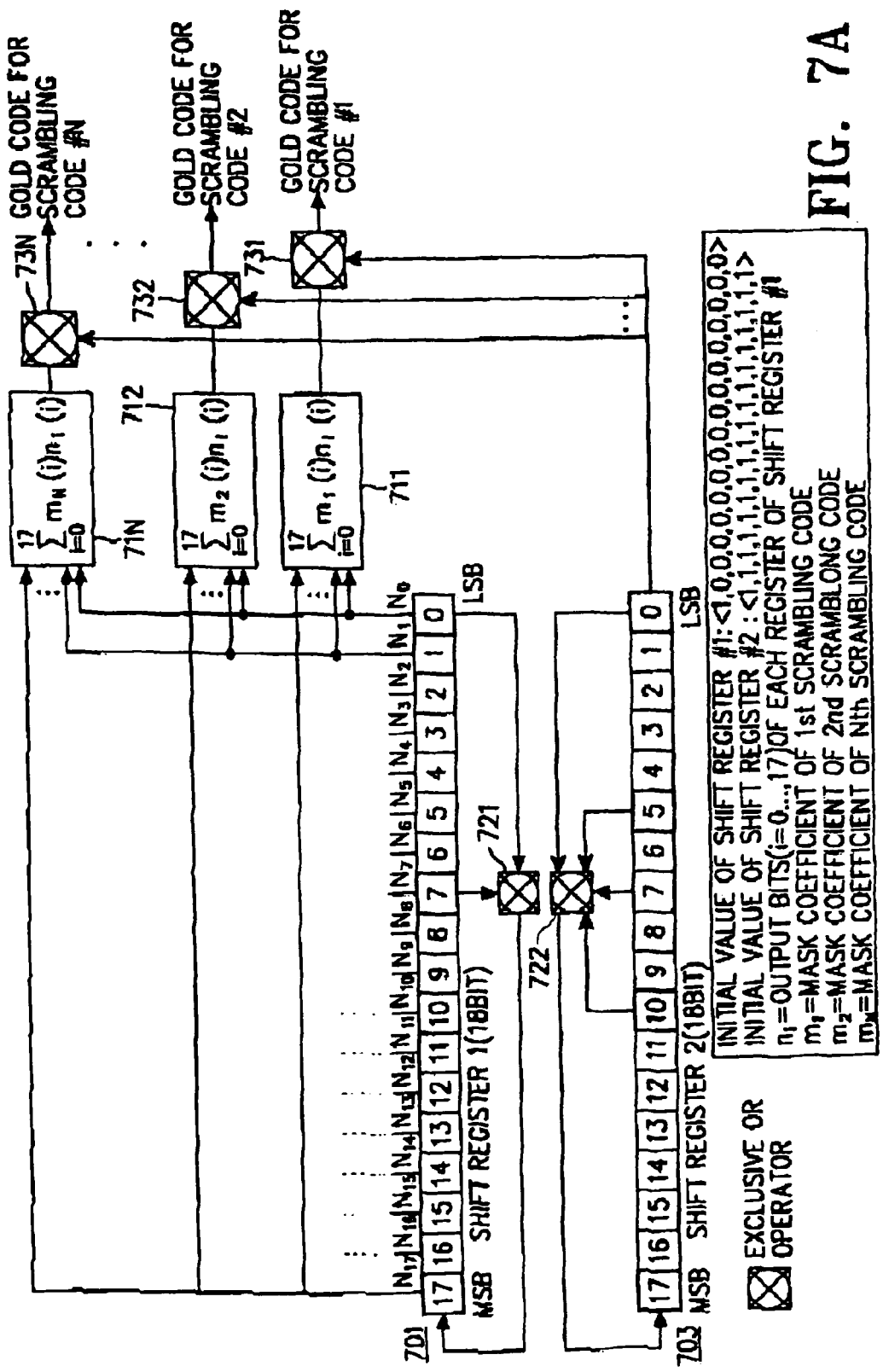
FIGS. 7A and 7B are diagrams illustrating detailed structures of the Gold code generator for simultaneously generating several Gold codes according to an embodiment of the present invention.
Figure 7B:
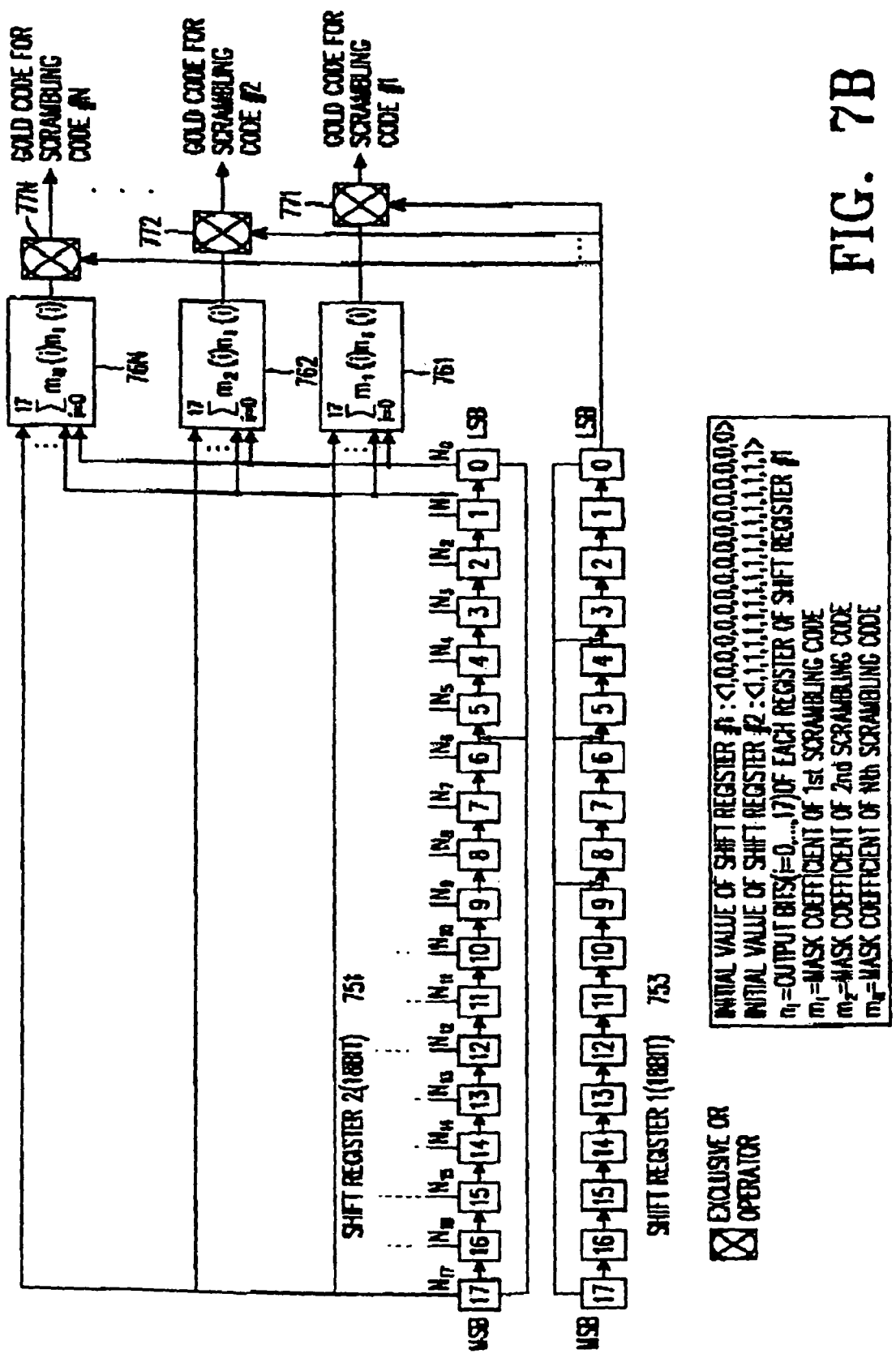

FIGS. 7A and 7B illustrate the detailed structures of the Gold code generator 601 for simultaneously generating the different Gold codes according to an embodiment of the present invention.

Referring to FIG. 7A, shift registers 701 and 703 each include 18 memories and generate m-sequences $m_1(t)$ and $m_2(t)$, respectively. XOR gates 721, 722 and 731-73N perform XOR operation on the inputs. Masking sections 711-71N each operate with different mask coefficients, and thus, can simultaneously generate a number of different m-sequences equal to the number of the masking sections. In FIG. 7A, 'N' corresponds to the number of the masking sections and is a positive number. Herein, 'N' is set to the number of the scrambling codes required by the base station or the mobile station (i.e., a value which is set according to the serviceable channel capacity of the mobile communication system). The number of delays 631-63N of FIG. 6 is equal to the number of the masking sections 711-71N, and delay the Gold codes generated by the corresponding XOR gates 731-73N for a specific chip period, thereby to generate imaginary components of the scrambling codes.

FIGS. 7A and 7B show the most typical m-sequence generation methods. Specifically, FIG. 7A shows a structure of a Gold code generator using a Fibbomacci technique, and FIG. 7B shows a structure of a Gold code generator using a Galois technique. Although the two generators are different in structure, they are designed to generate the same Gold codes. The m-sequence generators of FIGS. 7A and 7B are different from each other in the structure of the shift registers which are the m-sequence generating sections, and similar to each other in other structures and functions. In FIG. 7A, reference numeral 701 denotes a shift register having a length of 18, in which a generator polynomial of the m-sequence $m_1(t)$ is $f(x)=x^{18}+x^7+1$. The generator polynomial of the m-sequence $m_1(t)$ has a feedback property shown by Equation (5) below, with respect to consecutive symbols of the generated codes.

$$x(18+i)=[x(i)+x(i+7)] \text{ modulo } 2 \ (0 \leq i \leq 2^{18}-20) \tag{5}$$

For the generator polynomial, $f(x)=x^{18}+x^7+1$, of the m-sequence $m_1(t)$, the conventional scrambling code generator uses a binary value of the number of the scrambling codes as an initial value of the generator polynomial. That is, since the number of the primary scrambling codes is 512 and the number of the secondary scrambling code sets, each comprised of 511 secondary scrambling codes associated with the corresponding primary scrambling code, is 512, the conventional scrambling code generator uses a binary value of the number of 0 to 262143 as an initial value to generate 512*512 (=262,144) different scrambling codes in total.

However, the scrambling code generators of FIGS. 7A and 7B set an initial value of the generator polynomial, $f(x)=x^{18}+x^7+1$, of the m-sequence $m_1(t)$ to a given 18-bit binary value. Here, the 18-bit binary value is a given 18-bit binary value excluding an initial value used for a generator polynomial, $f(x)=x^{18}+x^{10}+x^7+x^5+1$, of the m-sequence $m_2(t)$.

Every base station uses the same 18-bit binary value for the initial value of the generator polynomial, $f(x)=x^{18}+x^7+1$, of the m-sequence $m_1(t)$. The reason for setting the initial value of $m_1(t)$ the same in every base station is as follows. Different Gold codes should be generated using the masks. However, if each base station uses different initial values, it is possible that the same Gold code would be generated by more than one base station. In FIG. 7A, '1,0,0,0,0,0,0,0,0,0,0,0,0,0,0,0,0,0' is used for the initial value of the m-sequence $m_1(t)$.

In FIG. 7A, reference numeral 703 denotes a shift register having the same length as the shift register 701, in which a generator polynomial of the m-sequence $m_2(t)$ is $f(x)=x^{18}+x^{10}+x^7+x^5+1$. Every base station also uses the same initial value of the m-sequence $m_2(t)$. Herein, the initial value of the shift register 703 is set to '1,1,1,1,1,1,1,1,1,1,1,1,1,1,1,1,1,1'.

The memory values of the shift register 701 are applied to the masking sections 711-71N, which generate new m-sequences by operating the received m-sequence $m_1(t)$ with previously set mask coefficients.

The respective masking sections 711-71N have different mask structures. The masking sections 711-71N each have the function of multiplying the memory values received from the shift register 701 by the corresponding mask coefficients and then summing the multiplied values. Multiplication and summation performed on the memory values of the shift register 701 and the mask coefficients are binary operations.

Figure 8:
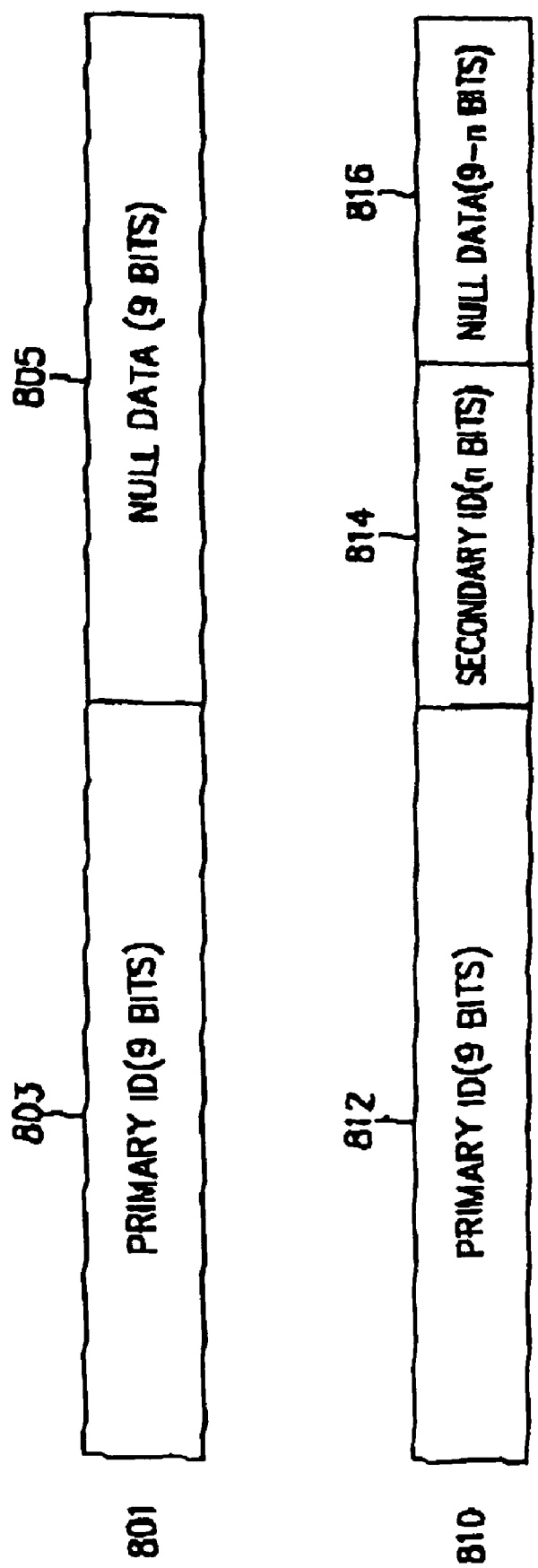
FIG. 8 is a diagram illustrating structures of the masks shown in FIGS. 7A and 7B.

FIG. 8 illustrates structures of the masks generated by the masking sections 711-71N. Referring to FIG. 8, a mask having the structure shown by 801 is used to generate a Gold code for generating the primary scrambling codes. The mask 801 has a length of 18 bits, wherein the left 9 bits (i.e., 9 bits from the MSB (Most Significant Bit) or the leftmost bit) are assigned for a primary ID 803 (which is a part indicating the binary value determined by binary converting the code number of the primary scrambling code) and the remaining 9 bits are assigned for null data 805. The 9 upper bits of the mask 801 are used to indicate the 512 primary scrambling codes. When generating the downlink scrambling codes, the base station or the mobile station of the mobile communication system converts a desired one of the numbers of 0 to 511 to a binary value and applies the converted binary value to the upper 9 bits of the mask 801, thereby to generate a Gold code.

For example, in order for the base station, which is assigned a code number 12 for the primary scrambling code, to generate the primary scrambling code corresponding to the code number 12, the base station applies '0,0,0,0,0,1,1,0,0' to the 9 upper bits of the mask 801 and then applies the mask 801 to the Gold code generator 701 of FIGS. 7A or 7B. As an another example, even when the mobile station located in the handoff area, which is in communication with the base station using the $12^{th}$ primary scrambling code, generates an another primary scrambling code other than the $12^{th}$ primary scrambling code in order to search a primary scrambling code for the handoff target base station, the scrambling code is generated in the same manner as described above. That is, when the mobile station generates the masks as many as the number of the primary scrambling codes desired to be generated and applies the generated masks to the Gold code generator 701 of FIG. 7A or 7B, it is possible to generate another desired primary scrambling code, while generating the $12^{th}$ primary scrambling code.

A mask having the structure shown by 810 is used to generate a Gold code for generating the secondary scrambling code. The mask 810 has a length of 18 bits, wherein 9 bits from the MSB are assigned for a primary ID 812 (i.e., an ID of the primary scrambling code) which is a part indicating the primary scrambling code, and n bits out of the remaining 9 bits are assigned for a secondary ID 814 (i.e., an ID of the secondary scrambling code) which is a part indicating the secondary scrambling code, and (9-n) bits are assigned for null data 816. The primary ID part 812 of the mask 810 is identical to the primary ID part 803 of the mask 801 in structure and function. The reason for assigning n bits for the secondary ID part 814 of the mask 810 is to provide a flexibility to the number of the secondary scrambling codes to be used by the base station. Although the number 'n' of the secondary scrambling codes corresponding to each primary scrambling code is 511 in maximum, the base station may not actually use all of the secondary scrambling codes. Therefore, the mobile communication systems can adjust the value of 'n' according to the number of the secondary scrambling codes. In the embodiment of the present invention, it is assumed that 4 bits are used for the secondary ID (i.e., n=4).

The secondary ID part 814 of the mask 810 is identical to the primary ID part 812 in function. For example, when the base station which scrambles every channel with the $12^{th}$ primary scrambling code has used up all the channel orthogonal codes associated with the $12^{th}$ primary scrambling code, the base station determines to use the secondary scrambling codes. When it is determined to use the secondary scrambling codes, the base station selects one of the code numbers of the available secondary scrambling codes having the code number of 1 to 511 (in the embodiment, the code number is 1 to 16, since n=14), and applies the selected one to the 9 lower bits of the mask 810, thus completing the mask 810. The mask 810 is comprised of the primary ID 812 and the secondary ID 814. By applying the mask 810 to the masking section of the scrambling code generator of FIG. 6, it is possible to simultaneously generate the primary scrambling code and the secondary scrambling code. If it is assumed that a code number of the secondary scrambling code to be generated is '4', a mask coefficient value being input to the mask 810 becomes '0,0,0,0,0,1,1,0,0' for the primary ID and '0,0,0,0,0,0,1,0,0' for the secondary ID. As a result, the mask 810 becomes '0,0,0,0,0,1,1,0,0,0,1,0,0,0,0,0,0,0'. At this point, the coefficient value of the mask 810 is input on the assumption that the 511 secondary scrambling codes are all used. Therefore, if the mobile communication system uses m secondary scrambling codes, the binary value of the code number of the secondary scrambling code is applied to an n-bit expression part of the secondary scrambling code of the mask 810, where 'n' is larger by 1 than an integer of $\log_2 m$. For example, when 16 secondary scrambling codes are used, the secondary ID is 4 bits in length.

The mask 801 and the mask 810 of FIG. 8 are shown by way of example only. As an alternative example, the positions of the 9-bit primary ID part 812 and the n-bit secondary ID part 814 can be exchanged. As shown in the two mask structures of FIG. 8, the mask for generating the Gold code for generating the primary scrambling code should necessarily include a binary value of the code number of 0 to 511 indicating the primary scrambling code, and the mask for generating the Gold code for generating the secondary scrambling code should necessarily include a binary value of the code number of 0 to 511 indicating the primary scrambling code number and an n-bit value representative of a code number of 1 to 511 indicating the secondary scrambling code. Further, if the secondary ID part 814 of the mask 810 is filled with the null data, the mask 810 becomes a mask for generating the primary scrambling code, which has the same structure as the mask 801. Various applications of the masks of FIG. 8 are shown in Table 1 below, in which the number of the secondary scrambling codes used in the base station is assumed to be 16.

TABLE 1

| BS Index | Secondary Scrambling Code Index | Mask | Remarks |
|---|---|---|---|
| 1 | 0 | <0,0,0,0,0,0,0,0,1, 0,0,0,0,0,0,0,0,0> | Primary Scrambling Code Mask |
|  | 4 | <0,0,0,0,0,0,0,0,1, 0,1,0,0,0,0,0,0,0> | Secondary Scrambling Code Mask |
|  | 13 | <0,0,0,0,0,0,0,0,1, 1,1,0,1,0,0,0,0,0> | Secondary Scrambling Code Mask |
| 243 | 0 | <0,1,1,1,1,0,0,1,1, 0,0,0,0,0,0,0,0,0> | Primary Scrambling Code Mask |
|  | 3 | <0,1,1,1,1,0,0,1,1, 0,0,1,1,0,0,0,0,0> | Secondary Scrambling Code Mask |
|  | 12 | <0,1,1,1,1,0,0,1,1, 1,1,0,0,0,0,0,0,0> | Secondary Scrambling Code Mask |

The method for generating the Gold code by using the masks shown in FIG. 8 enables effective classification of the primary scrambling code and the secondary scrambling code. A downlink channel transmitter of the base station and a downlink channel receiver of the mobile station, which use the scrambling code generator of FIG. 6, require no separate storage for the primary scrambling codes and the secondary scrambling codes. The scrambling code generator of FIG. 6 using the masks can classify the primary scrambling codes depending on the binary value of the number of 0 to 511 being input to the mask 801. Further, since the secondary scrambling codes are classified according to a value of the primary scrambling code as shown in Table 1, there is no possibility that the same secondary scrambling codes are generated by the adjacent base stations. Therefore, it is possible to classify even the secondary scrambling codes according to the primary ID, being input to the mask, of the primary scrambling code of 0 to 511 and the secondary ID of the secondary scrambling code of 1 to 512. For classification of the primary scrambling codes and the secondary scrambling codes, the base station and the mobile station require no separate storages.

The output bits of the masking sections 711-71N in the Gold code generator of FIG. 7A are XORed with the output bits of the shift register 703 by the XOR gates 731-73N, thereby to generate different Gold codes. The Gold code generator of FIG. 7B also generates the different Gold codes in the same method as shown in FIG. 7A. The generated different Gold codes are used to generate different scrambling codes.

Figure 9:
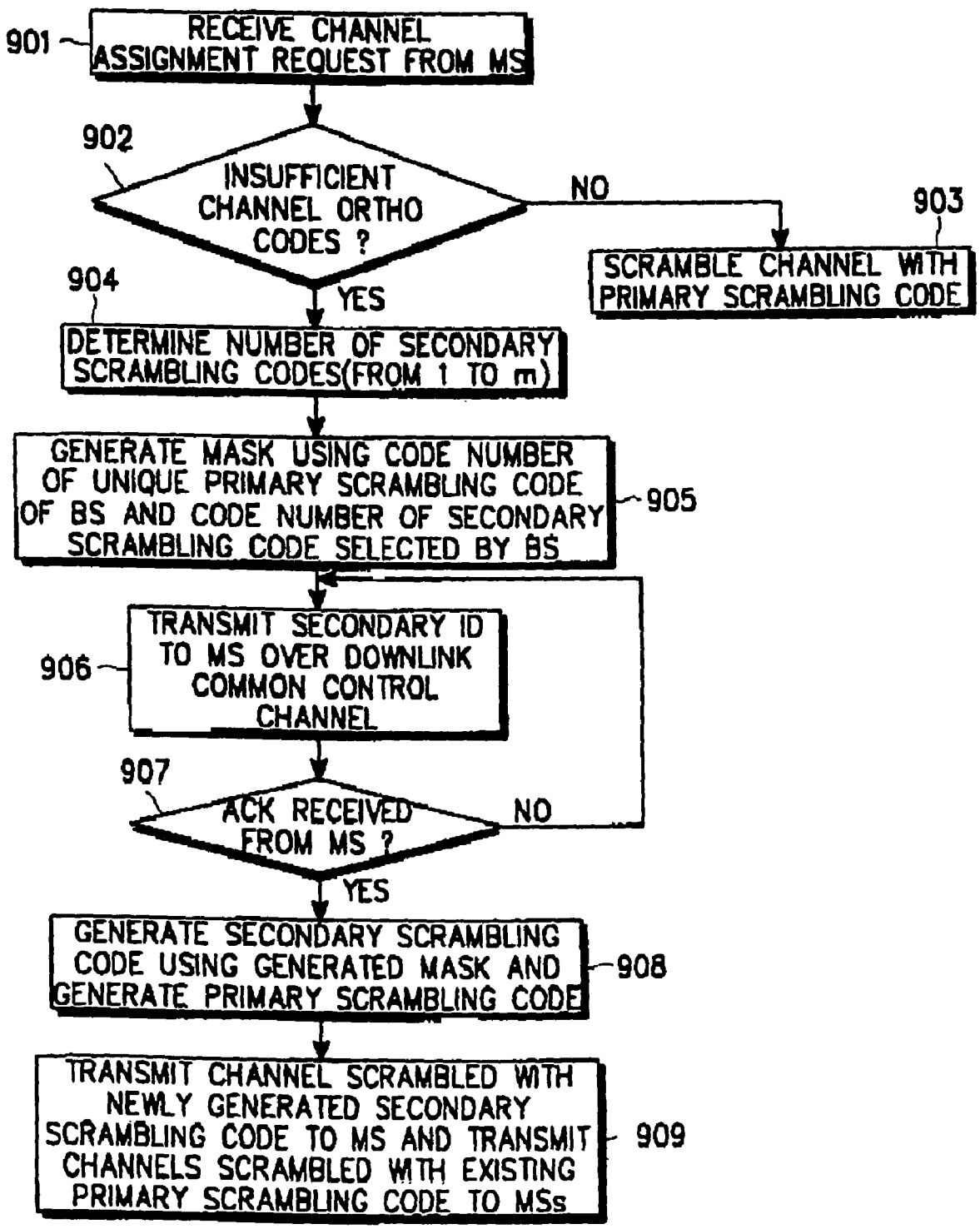
FIG. 9 is a flow chart illustrating the procedure for generating scrambling codes in the base station according to an embodiment of the present invention.

FIG. 9 illustrates an operation of the base station, which uses the scrambling code generator of FIG. 6.

Referring to FIG. 9, the base station determines in step 901 whether a channel assignment request has been received from the mobile station. The mobile station requests channel assignment in the following two cases. In a first case, the mobile station requests assignment of another channel, while performing communication with a presently assigned dedicated channel. In another case, the mobile station requests assignment of a dedicated channel for communication, in a state where there is no presently assigned channel. Herein, it will be assumed that the mobile station requests assignment of the dedicated channel for the first time.

Upon receipt of the channel assignment request from the mobile station in step 901, a radio resource controller (RRC) in the base station analyzes the number of subscribers being presently serviced and a capacity of the channels assigned to the subscribers in step 902, to determine whether the number of the channel orthogonal codes used together with the primary scrambling code is insufficient or not. That is, the base station determines in step 902 whether the mobile station can assign a channel using the primary scrambling code or has an insufficient number of the channel orthogonal codes to assign the channel using the primary scrambling code. If it is determined in step 902 that there is a channel orthogonal code to be assigned to the mobile station using the primary scrambling code, the RRC of the base station assigns to the mobile station a mask of a channel to be scrambled with the primary scrambling code and information about the assigned channel orthogonal code in step 903. At this point, since the primary scrambling code is used for the downlink common control channel, the base station may not transmit an ID of the primary scrambling code (i.e., primary ID).

However, if it is determined in step 902 that there is an insufficient number of channel orthogonal codes used together with the primary scrambling code, the RRC of the base station determines to use the secondary scrambling code in step 904, in order to accept a new channel assignment request from the mobile station. After determining to use the secondary scrambling code, the base station generates a mask in order to generate the secondary scrambling code in step 905. Applied to the generated mask are binary values of the primary ID and the secondary ID. The secondary ID is determined as a value between 1 and m in step 904, and the mask is generated in step 905. The generated mask may become a mask comprised of the primary ID and the secondary ID like the mask 810 of FIG. 8. Further, herein, 'm' is assumed to be 16 (for n=4).

After generating the mask for the newly generated scrambling code, the base station transmits, in step 906, ID information of the secondary scrambling code to be newly generated and information about the assigned channel orthogonal code to the mobile station which will receive the scrambled channel with the newly generated secondary scrambling code. Here, the scrambling code information being transmitted to the mobile station is the secondary ID, and the primary ID is not transmitted. That is, since the mobile station knows the primary scrambling code being used in the base station through the common control channel, the mobile station can generate the secondary scrambling code, even though only the secondary ID is received. The information being transmitted to the mobile station is transmitted over the common control channel scrambled with the primary scrambling code. Here, the downlink common control channel may be a paging channel (PCH) or a forward access channel (FACH). When the secondary scrambling code is generated in the conventional method, it is necessary to transmit information indicating use of the above secondary scrambling code and information including the code number of the newly generated scrambling code of 512 to 262,144. Therefore, conventionally, 18 bits are required in transmitting the secondary ID in order to inform the mobile station of the secondary scrambling code. However, when the base station and the mobile station use the scrambling code generator of FIG. 6 according to the present invention, the information transmitted from the base station to the mobile station may include only the information indicating use of the secondary scrambling code and the n-bit secondary ID. When the mask 810 of FIG. 8 is used, the secondary ID information has a length of 1 to 9 bits, and in the embodiment of the present invention, it is assumed that the secondary ID has a length of 4 bits.

After transmitting the secondary scrambling code information of the mask 810, the base station awaits an acknowledgement (ACK) from the mobile station in step 907. Upon receipt of ACK from the mobile station, the base station generates in step 908 the secondary scrambling code using the mask 810 generated in the step 905. That is, the base station newly generates the secondary scrambling code while generating the primary scrambling code, by applying the mask to the scrambling code generator of FIG. 6. Thereafter, in step 909, the base station transmits the channels scrambled with the primary scrambling code and the channels scrambled with the secondary scrambling code to the mobile station.

Unlike the case of FIG. 9, reference will now be made to another case where the mobile station requests assignment of a new channel during communication with the base station and at this time, there is no channel orthogonal code used together with the primary scrambling code. In this case, the base station assigns the channel code scrambled with the secondary scrambling code to the mobile station, and transmits the secondary ID in the same method as shown in FIG. 9. However, unlike the case of FIG. 9, the secondary ID is transmitted over the dedicated channel, which was used by the mobile station in communication with the base station before assignment request of the new channel. That is, the base station transmits the secondary scrambling code information while assigning the channel to the mobile station presently in service, and the secondary scrambling code information is transmitted over the channel presently in service.

Figure 10:
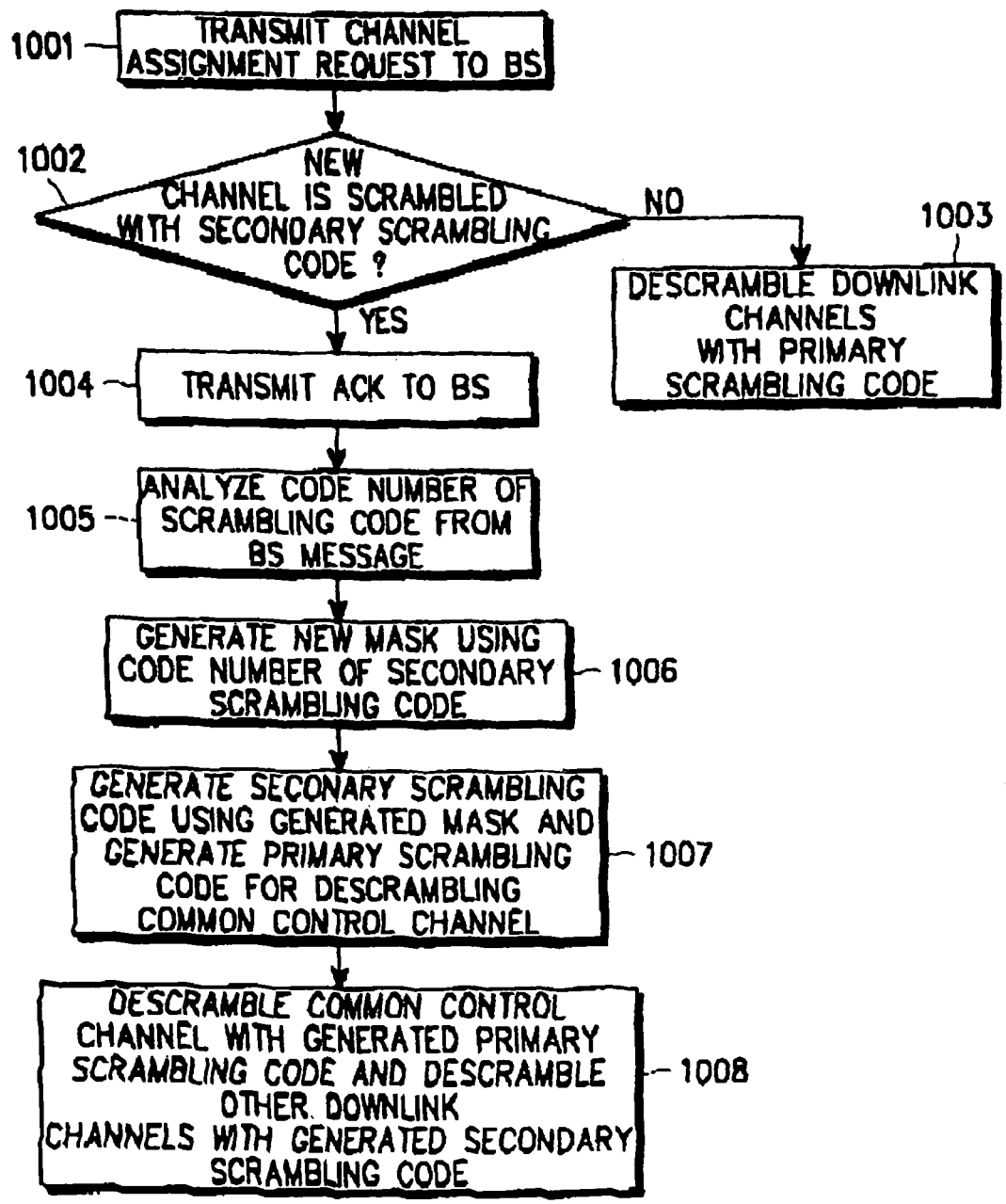
FIG. 10 is a flow chart illustrating the procedure for generating scrambling codes in the mobile station according to an embodiment of the present invention.

FIG. 10 illustrates an operation of the mobile station in association with the operation of the base station shown in FIG. 9.

Referring to FIG. 10, the mobile station requests assignment of a new channel in step 1001, and awaits a response from the base station in step 1002. That is, when the mobile station requests assignment of a new channel, the base station analyzes a capacity of the available channels, generates a response message according to the analysis results, and transmits the generated response message to the mobile station. Upon receipt of the response message from the base station, the mobile station analyzes the response message received from the base station, in step 1002. The received message includes information about whether the base station will assign a channel scrambled with the primary scrambling code to the mobile station or assign a channel scrambled with the secondary scrambling code to the mobile station. When the base station assigns the channel scrambled with the secondary scrambling code to the mobile station, the received message further includes information about the secondary scrambling code.

If it is determined in step 1002 that the received message indicates that the base station assigns a channel scrambled with the primary scrambling code to the mobile station, the mobile station generates the primary scrambling code in the scrambling code generator of FIG. 6, and descrambles the downlink channel with the generated primary scrambling code in step 1003, thereby to receive the downlink channel signal transmitted from the base station.

However, if it is determined in step 1002 that the received message indicates that the base station assigns a channel scrambled with the secondary scrambling code to the mobile station, the mobile station transmits an ACK message to the base station in step 1004. Thereafter, in step 1005, the mobile station analyzes the secondary ID included in the message received in step 1002. Subsequently, in step 1006, the mobile station generates a mask for generating the secondary scrambling code, the mask having the mask structure 810 shown in FIG. 8.

In step 1007, the mobile station simultaneously generates the secondary scrambling code and the primary scrambling code for descrambling the common control channel scrambled with the primary scrambling code before transmission, by using the mask generated in step 1006 and the scrambling code generator of FIG. 6. Thereafter, in step 1008, the mobile station descrambles the channels scrambled with the respective scrambling codes using the generated primary scrambling code and secondary scrambling code.

Figure 5:
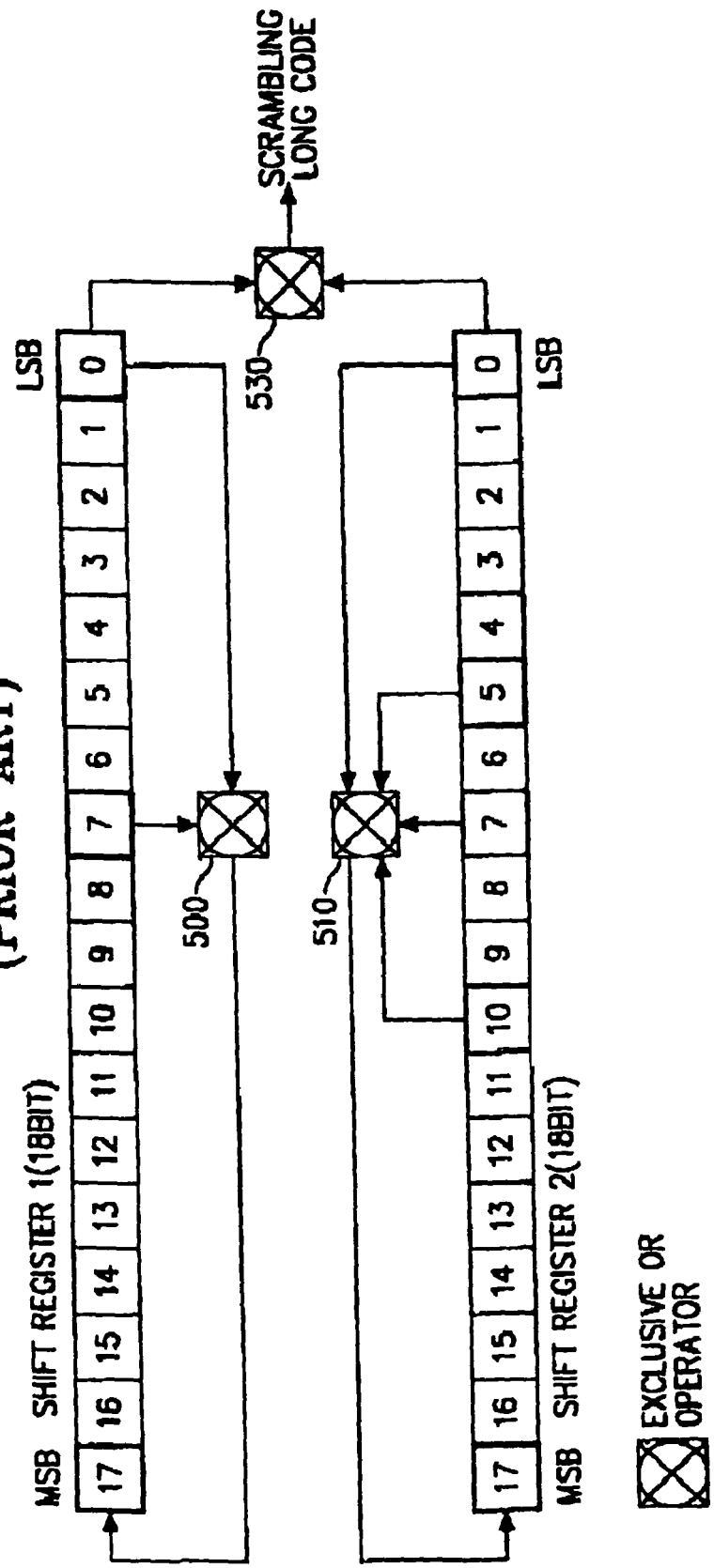
FIG. 5 is a diagram illustrating a detailed structure of the Gold sequence generators of FIGS. 2 and 4.

As described above, when all the channel orthogonal codes used for the primary scrambling code of the base station are used up, the base station should use the secondary scrambling code. In this case, if the conventional Gold code generator of FIG. 5 is used, it is necessary to provide a number of the Gold code generators equal to the number of the necessary secondary scrambling codes. However, when the Gold code generator of FIG. 7A or 7B according to the present invention is used, it is possible to simultaneously generate the primary scrambling code and the secondary scrambling code by using a mask for generating the primary scrambling code and a mask for generating the secondary scrambling code in a single Gold code generator. To generate the secondary scrambling codes, the number of masks provided is equal to the number of the secondary scrambling codes. It is also possible to generate the secondary scrambling code using an assigned mask, when necessary.

In the mobile communication system, the base station can use the primary scrambling code for the downlink common control channel, and use the primary scrambling code or the secondary scrambling code for the downlink dedicated channel according to the states of the channel orthogonal codes, which can be assigned using the primary scrambling code. In this case, if the mobile station uses the conventional Gold code generator of FIG. 5, the mobile station should include one descrambler for descrambling the signals received over the downlink common control channel and the downlink dedicated channel using the primary scrambling code, and another descrambler for descrambling the signal received over the other downlink dedicated channel with the secondary scrambling code. However, when the mobile station uses the Gold code generator of FIG. 7A or 7B according to the present invention, it is possible to simultaneously generate the different scrambling codes by using a number of masks equal to the number of the necessary scrambling codes.

As an another example of the mobile station, if the mobile station exists in the handoff area in a mobile communication environment, it is necessary to generate a scrambling code for searching the primary scrambling code of the handoff target base station as well as the scrambling code for descrambling the primary scrambling code of the base station to which the mobile station belongs. Since the process for searching the primary scrambling code of the target base station should be performed in the state where the mobile station continues communication with the base station to which it belongs, the mobile station should necessarily include the function of simultaneously generating several scrambling codes. However, when the conventional Gold code generator of FIG. 5 is used, it is necessary to provide the Gold code generators as many as the number of the scrambling codes to be generated. However, when the Gold code generator of FIG. 7A or 7B according to the present invention is used, it is possible to implement the descrambler of the mobile station, which can simultaneously generate the scrambling codes, which need descrambling.

As described above, the novel descrambling code generator for the base station transmitter and the mobile station receiver of the mobile communication system can simultaneously generate a plurality of scrambling codes using a single code generator. Further, by using the novel scrambling code generator, the base station transmitter or the mobile station receiver can generate the scrambling codes without a separate storage, thereby reducing its hardware complexity.

In addition, by generating the Gold code for generating the scrambling code using the mask, one scrambling code generator can simultaneously generate different scrambling codes. In addition, when transmitting information about the secondary scrambling code in order to expand the channel capacity, the base station transmits an ID of the secondary scrambling code (i.e., secondary ID), and the mobile station can generate the secondary scrambling code by receiving the secondary ID. Therefore, it is possible to readily generate the secondary scrambling code by reducing an amount of the information for generating the secondary scrambling code.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for data transmission by a base station, the method comprising the steps of:
   upon receipt of an assignment request of a data channel from a mobile station, determining a secondary scrambling code identifier (ID);
   transmitting the secondary scrambling code ID to the mobile station;
   generating a primary scrambling code corresponding to a primary scrambling code ID using the primary scrambling code ID by one to one mapping the primary scrambling code ID to the primary scrambling code;
   generating a secondary scrambling code using the primary scrambling code ID and the secondary scrambling code ID by one to one mapping a combination of the secondary scrambling code ID and the primary scrambling code ID to the secondary scrambling code, wherein at least one secondary scrambling code depends on the corresponding primary scrambling code;
   scrambling a common channel using the primary scrambling code for identifying the base station;
   scrambling the data channel using the secondary scrambling code; and
   transmitting the scrambled common and data channel.

2. The method of claim 1, further comprising the steps of:
   analyzing a capacity of orthogonal codes used with the primary scrambling code;
   determining to use the secondary scrambling code, if the capacity of orthogonal codes is insufficient; and
   determining to use only the primary scrambling code, if the capacity of orthogonal codes is sufficient.

3. The method of claim 1, wherein the secondary scrambling code ID is comprised of 4 bits.

4. The method of claim 1, wherein the secondary scrambling code ID is transmitted over a common control channel using the primary scrambling code.

5. The method of claim 1, wherein the secondary scrambling code ID is transmitted over a dedicated channel in service.

6. The method of claim 1, wherein the scrambling codes generating step comprises the steps of:
   generating a masked sequence by masking a first sequence with a mask;
   generating the primary scrambling code and the secondary scrambling code by adding the masked sequence with a second sequence; and
   outputting the generated scrambling codes as a real component scrambling code, and an imaginary part scrambling code generated by shifting the real part scrambling code by a specific chip period.

7. An apparatus for data transmission in a base station, comprising:
   a receiver for receiving an assignment request of data channel from a mobile station, and determining a secondary scrambling code identifier (ID);
   a transmitter for transmitting the secondary scrambling code ID to the mobile station;
   a scrambling code generator for generating a primary scrambling code corresponding to a primary scrambling code ID using the primary scrambling ID by one to one mapping the primary scrambling code ID to the primary scrambling code, and generating a secondary scrambling code using the primary scrambling code ID and the secondary scrambling code ID by one to one mapping a combination of the secondary scrambling code ID and the primary scrambling code ID to the secondary scrambling code, wherein at least one secondary scrambling code depends on the corresponding primary scrambling code;
   a scrambler for scrambling a common channel using the primary scrambling code for identifying a base station, and scrambling the data channel using the secondary scrambling code; and
   a transmitter for transmitting the scrambled common and data channel.

8. The apparatus of claim 7, further comprising a controller for analyzing a capacity of orthogonal codes used with the primary scrambling code for a channel assignment for the mobile station, determining to use the secondary scrambling code when the capacity of orthogonal codes is insufficient, and determining to use the primary scrambling code when the capacity of orthogonal codes is sufficient.

9. The apparatus of claim 7, wherein the secondary scrambling code ID is comprised of 4 bits.

10. The apparatus of claim 7, wherein the secondary scrambling code ID is transmitted over a common control channel using the primary scrambling code.

11. The apparatus of claim 7, wherein the secondary scrambling code ID is transmitted over a dedicated channel presently in service.

12. The apparatus of claim 7, wherein the scrambling code generator comprising:
   a first sequence generator for generating a masked sequence by masking a first sequence with a mask;
   a adder for generating the primary scrambling code and the secondary scrambling code by adding the masked sequence with a second sequence; and
   output port for outputting the generated scrambling codes as real component scrambling codes, and imaginary part scrambling codes generated by shifting the real part scrambling codes by a specific chip period.

13. A method for data transmission by a mobile station, the method comprising the steps of:
   transmitting an assignment request of a channel to a base station;
   receiving a secondary scrambling code identifier (ID) being comprised of 4 bits from the base station;
   generating a primary scrambling code corresponding to a primary scrambling code ID using the primary scrambling code ID by one to one mapping the primary scrambling code ID to the primary scrambling code;
   generating a secondary scrambling code using the primary scrambling code ID and the secondary scrambling code ID by one to one mapping a combination of the secondary scrambling code ID and the primary scrambling code ID to the secondary scrambling code, wherein at least one secondary scrambling code depends on the corresponding primary scrambling code; and descrambling a common control channel with the generated primary scrambling code and a data channel with the generated secondary scrambling code.

14. The method of claim 13, wherein the scrambling codes generating step comprises the steps of:

generating a masked sequence by masking a first sequence with a mask;

generating the secondary scrambling code by adding the masked sequence to a second sequence; and outputting the generated scrambling codes as a real component scrambling codes, and an imaginary part scrambling code generated by shifting the real part scrambling code by a specific chip period.

15. An apparatus for data transmission in a mobile station, comprising:

a controller for requesting an assignment of a channel to a base station;

a receiver for receiving a secondary scrambling code identifier (ID) being comprised of 4 bits from the base station;

a scrambling code generator for generating a primary scrambling code corresponding to a primary scrambling code ID using the primary scrambling code ID by one to one mapping the primary scrambling code ID to the primary scrambling code, and generating a secondary scrambling code using the primary scrambling code ID and the secondary scrambling code ID by one to one mapping a combination of the secondary scrambling code ID and the primary scrambling code ID to the secondary scrambling code, wherein at least one secondary scrambling code depends on the corresponding primary scrambling code; and a descrambler for descrambling a common control channel with the generated primary scrambling code and a data channel with the generated secondary scrambling code.

16. The apparatus of claim 15, wherein the scrambling codes generator comprising:

a first sequence generator for generating a masked sequence by masking a first sequence with a mask;

an adder for generating the primary scrambling code and the secondary scrambling code by adding the masked sequence with a second sequence; and an output port for outputting the generated scrambling codes as a real component scrambling code, and an imaginary part scrambling code generated by shifting the real part scrambling code by a specific chip period.

17. The method of claim 13, wherein the secondary scrambling code ID is comprised of 4 bits.

18. The method of claim 13, wherein the secondary scrambling code ID is received over the common control channel using the primary scrambling code.

19. The method of claim 13, wherein the primary scrambling code ID is assigned to the base station for identifying the base station.

20. The apparatus of claim 15, wherein the secondary scrambling code ID is comprised of 4 bits.

21. The apparatus of claim 15, wherein the secondary scrambling code ID is transmitted over a common control channel using the primary scrambling code.

22. The apparatus of claim 15, wherein the primary scrambling code ID is assigned to the base station for identifying the base station.

23. The method of claim 13, wherein the secondary scrambling code ID is transmitted over a dedicated channel in service.

24. The apparatus of claim 15, wherein the secondary scrambling code ID is transmitted over a dedicated channel in service.

* * * * *